United States Patent
Gunter et al.

(10) Patent No.: US 7,281,725 B1
(45) Date of Patent: Oct. 16, 2007

(54) TRICYCLE AND GUIDE HANDLE

(75) Inventors: David M. Gunter, Kettering, OH (US); Andrew J. Bean, Cincinnati, OH (US)

(73) Assignee: Huffy Corporation, Miamisburg, OH (US)

( * ) Notice: Subject to any disclaimer, the term of this patent is extended or adjusted under 35 U.S.C. 154(b) by 0 days.

(21) Appl. No.: 11/272,931

(22) Filed: Nov. 14, 2005

Related U.S. Application Data

(60) Division of application No. 10/744,977, filed on Dec. 22, 2003, now Pat. No. 7,000,935, which is a continuation-in-part of application No. 10/374,919, filed on Feb. 25, 2003, now Pat. No. 6,874,802.

(51) Int. Cl.
*B62K 21/10* (2006.01)

(52) U.S. Cl. ............... 280/272; 280/288.4; 280/293

(58) Field of Classification Search ............ 280/272, 280/288.4, 293, 271
See application file for complete search history.

(56) References Cited

U.S. PATENT DOCUMENTS

| | | |
|---|---|---|
| 579,664 A | 3/1897 | McConley |
| 591,864 A | 10/1897 | Meyer |
| 642,269 A | 1/1900 | Smith |
| 726,610 A | 4/1903 | Zech |
| 1,230,801 A | 6/1917 | Schriver |
| 1,449,255 A | 3/1923 | Abrahams et al. |
| 1,570,410 A | 1/1926 | Strauss |
| 1,793,848 A | 2/1931 | Gill et al. |
| D166,692 S | 5/1952 | Lines |
| 2,672,351 A | 3/1954 | Kane |
| 2,787,353 A | 4/1957 | Spararagen |
| 3,256,034 A | 6/1966 | Condray |
| 3,485,507 A | 12/1969 | Christof |
| 3,705,733 A | 12/1972 | Koyama et al. |
| 3,954,283 A | 5/1976 | Boehm et al. |
| 4,006,915 A | 2/1977 | Parker |
| 4,138,131 A | 2/1979 | Sommer |
| 4,261,588 A | 4/1981 | Kassai |
| 4,346,725 A | 8/1982 | Shaw |
| 4,608,729 A | 9/1986 | Huang |

(Continued)

FOREIGN PATENT DOCUMENTS

FR 2587672 A1 2/1987

(Continued)

OTHER PUBLICATIONS

Timmeetoy, Catalog with Push, Pedal & Ride Trike Assembly Instructions. 1997.

(Continued)

*Primary Examiner*—Lesley D. Morris
*Assistant Examiner*—Daniel Yeagley
(74) *Attorney, Agent, or Firm*—Michael J. Bell; Howrey LLP

(57) ABSTRACT

A tricycle includes a mainframe with front and rear sections. The front section may include a steering assembly with a rotatable wheel. The rear section may provide support for two spaced wheels and may be configured to provide a substantially unencumbered open area between the spaced wheels. The tricycle features a guide handle removeably connected to the tricycle and a locking mechanism configured to lock the steering assembly in a predetermined stationary position.

15 Claims, 4 Drawing Sheets

U.S. PATENT DOCUMENTS

| | | |
|---|---|---|
| 4,653,773 A | 3/1987 | Graft |
| 4,674,761 A | 6/1987 | Kassai |
| 4,700,963 A | 10/1987 | Burns et al. |
| 4,714,261 A | 12/1987 | Kassai |
| 4,744,575 A | 5/1988 | Tonelli |
| D296,774 S | 7/1988 | Armstrong |
| 4,852,898 A | 8/1989 | Donoghue et al. |
| 4,887,827 A | 12/1989 | Heggie |
| 4,903,857 A | 2/1990 | Klopfenstein |
| D310,644 S | 9/1990 | Koehler et al. |
| 5,028,066 A | 7/1991 | Garth |
| 5,029,891 A | 7/1991 | Jacobs |
| 5,085,063 A | 2/1992 | Van Dyke et al. |
| D334,157 S | 3/1993 | Tonelli |
| 5,279,181 A | 1/1994 | Boudreau |
| 5,306,030 A | 4/1994 | Becka |
| D355,870 S | 2/1995 | Dieudonne |
| 5,467,838 A | 11/1995 | Wu |
| 5,499,834 A | 3/1996 | Pasin et al. |
| 5,505,493 A | 4/1996 | Camfield et al. |
| 5,558,348 A | 9/1996 | Becka |
| 5,564,313 A | 10/1996 | Hoblingre |
| 5,669,624 A | 9/1997 | Eichhorn |
| 5,823,554 A | 10/1998 | Lau |
| 5,924,713 A | 7/1999 | Li |
| 6,003,890 A | 12/1999 | Inouye |
| D427,112 S | 6/2000 | Chaudeurge |
| 6,082,754 A | 7/2000 | Jeunet et al. |
| 6,089,587 A | 7/2000 | Li |
| 6,120,048 A | 9/2000 | Li |
| 6,135,479 A | 10/2000 | Tibay et al. |
| 6,149,178 A | 11/2000 | Bradbury et al. |
| 6,161,847 A | 12/2000 | Howell et al. |
| 6,164,666 A | 12/2000 | Prea |
| 6,170,841 B1 | 1/2001 | Mizuta |
| 6,186,524 B1 | 2/2001 | McQueeny et al. |
| 6,257,598 B1 | 7/2001 | Song |
| 6,276,694 B1 | 8/2001 | Song |
| 6,302,421 B1 | 10/2001 | Lee |
| 6,343,806 B1 | 2/2002 | Lee |
| 6,378,884 B1 | 4/2002 | Kettler |
| 6,419,243 B2 | 7/2002 | Song |
| 6,443,469 B1 | 9/2002 | Cross et al. |
| 6,471,229 B2 | 10/2002 | Stewart |
| 6,491,312 B2 | 12/2002 | Reynolds et al. |
| 6,530,589 B1 | 3/2003 | Ma |
| 6,595,531 B2 | 7/2003 | De Oliveira |
| 6,612,598 B2 | 9/2003 | Wu |
| 6,666,470 B2 | 12/2003 | Li |
| 6,685,207 B1 | 2/2004 | Blake |
| 6,799,772 B2 | 10/2004 | Kettler et al. |
| 6,874,802 B2 * | 4/2005 | Gunter et al. ............ 280/288.4 |
| 6,918,606 B2 * | 7/2005 | Petrishe ...................... 280/293 |
| 7,000,935 B2 * | 2/2006 | Gunter et al. ............... 280/272 |
| 7,077,415 B2 | 7/2006 | Ikeda et al. |
| 7,156,408 B2 | 1/2007 | Kettler et al. |
| 2002/0089138 A1 | 7/2002 | Reynolds et al. |
| 2002/0089139 A1 | 7/2002 | Reynolds et al. |
| 2003/0141693 A1 | 7/2003 | Wu |
| 2003/0178806 A1 * | 9/2003 | Nelson ....................... 280/204 |
| 2003/0201621 A1 | 10/2003 | Jang |
| 2005/0035596 A1 | 2/2005 | Ikeda et al. |
| 2006/0001232 A1 | 1/2006 | Rutowski |
| 2006/0027996 A1 | 2/2006 | Chamberlain et al. |

FOREIGN PATENT DOCUMENTS

| | | |
|---|---|---|
| JP | 3045486 | 2/1991 |
| JP | 08142966 A | 6/1996 |
| JP | 10250665 | 9/1998 |

OTHER PUBLICATIONS

Amazon.com, "Radio Flyer Fold 2 Go XL Trike." Online catalog. Accessed Oct. 4, 2006.

* cited by examiner

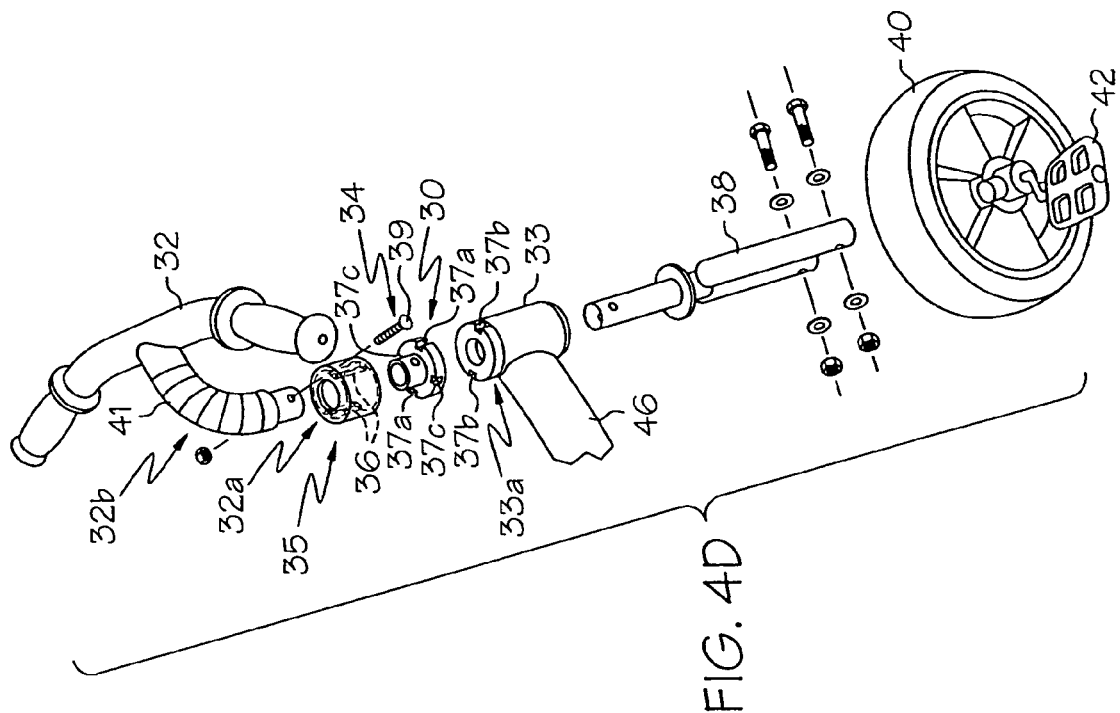
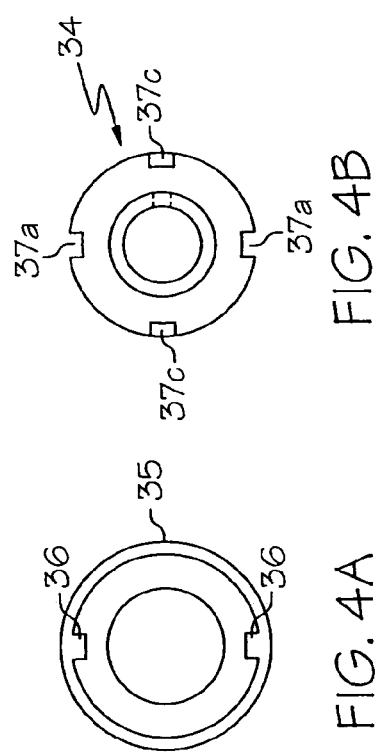

TRICYCLE AND GUIDE HANDLE

CROSS-REFERENCES TO RELATED APPLICATIONS

This application is a divisional application of U.S. Non-Provisional application Ser. No. 10/744,977 filed Dec. 22, 2003, now U.S. Pat. No. 7,000,935, which is a continuation in part of U.S. Non-Provisional application Ser. No. 10/374,919, filed Feb. 25, 2003, now U.S. Pat. No. 6,874,802, the entire disclosures of which are hereby incorporated herein by reference.

FIELD OF THE INVENTION

The present invention relates to a tricycle designed for multi-stage development of a child and providing an easily removable guide handle.

BACKGROUND OF THE INVENTION

Basic three wheeled bicycles or tricycles are known in the art. A majority of such tricycles include a frame secured to two wheels at the rear of the tricycle, a seat secured to the frame and a steering assembly secured to the front of the tricycle including handlebars, a head tube, and a fork secured to a third, usually larger, front wheel. A set of pedals are usually secured to an axle of the front wheel so that a child may operate the tricycle by actuating the pedals in a circular motion. In addition, some tricycles comprise a step secured to the rear portion of the frame between the rear wheels to shield the axle and allow the child to operate the tricycle by placing one foot on the step and using the other foot to kick the ground, thus moving the tricycle forward.

An issue arises with basic tricycles in that younger children with shorter legs may have trouble riding a basic tricycle as their legs may not be long enough to actuate the pedals and/or the child may not be developmentally ready to power and guide the tricycle. In such cases, an adult may be required to push and/or guide a child seated on the tricycle during early developmental uses.

Heretofore, guide handles have been provided to give the guardian some control over the child and tricycle. However, previous guide handles are often difficult to remove from the tricycle and do not provide an alternative surface (apart from unreachable, turning pedals) for placement of a younger, smaller rider's feet to prevent scuffing as a result of the feet dangling to the ground.

Accordingly, there is a desire for an improved tricycle configured so that a guide handle with integrated footrests may be easily added or removed therefrom.

SUMMARY OF THE INVENTION

Accordingly, the present invention is intended to address and obviate problems and shortcomings and otherwise improve previous tricycles and guide handles therefore.

To achieve the foregoing and other objects in accordance with additional exemplary embodiments of the present invention, a tricycle comprises a fork, a mainframe portion with front and rear sections, a front wheel, and two spaced rear wheels. The fork may be attached adjacent the front section, while the rear section may provide support for the spaced wheels and may be configured to provide a substantially unencumbered open area between the spaced wheels.

To further achieve the foregoing and other objects and in accordance with the exemplary embodiments of the present invention a removable guide handle for a tricycle is provided with a handle frame having upper and lower ends. A set of footrests may be integrally connected to the guide handle adjacent the lower end and a supervisor handle may be integrally connected to the guide handle adjacent the upper end. The guide handle may also comprise a connector on the frame configured to selectively attach the guide handle to the tricycle.

To even further achieve the foregoing and other objects of the present invention, a tricycle comprises a mainframe with front and rear sections. The front section may include a steering assembly with a rotatable wheel mounted thereto, while the rear section may support two rotatable wheels mounted thereto. The tricycle may also include a seat assembly mounted to the mainframe, a guide handle having at least one connector with a pair of footrests integrally connected adjacent its lower end, and a receptor adjacent the mainframe configured to receive the connector.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIGS. 4A–4D illustrate a locking mechanism in accordance with the present invention.

DETAILED DESCRIPTION OF EXEMPLARY EMBODIMENTS

Figure 1:
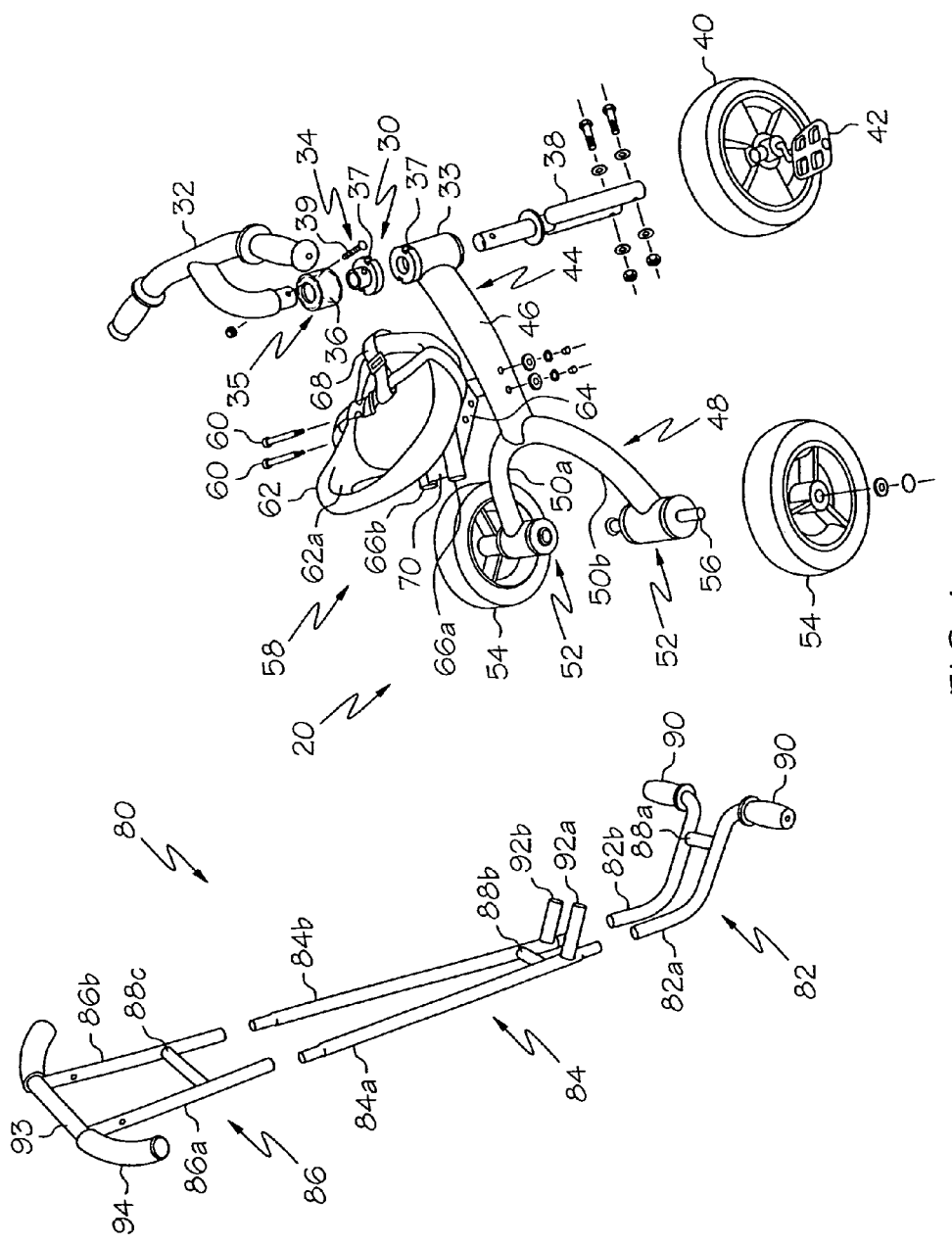
FIG. 1 illustrates a partially exploded view of an exemplary tricycle and guide handle made according to the present invention.

Referring to the drawing figures in detail, wherein like numerals indicate like elements throughout the drawing figures, FIG. 1 illustrates an exploded view of an exemplary tricycle 20 and guide handle 80 according to the present invention. Tricycle 20 may comprise a steering assembly 30, a mainframe assembly 44 and a seat assembly 58. Tricycle 20 and components therefore may be made of any combination of durable materials, including but not limited to metal, plastic, composites, fiberglass, and the like.

Steering assembly 30 may generally include handlebars 32 of any of a variety of shapes and sizes, a head tube 33, and a fork 38 secured together with fastener 39. A front wheel 40 with pedal 42 may be mounted to the fork 38. As illustrated in FIG. 1, the steering assembly 30 may be reminiscent of a standard or conventional tricycle and/or bicycle steering assembly. If desired, and as discussed later herein, steering assembly 30 may comprise a lock member 34 and cap 35 for locking handlebars 32 in a stationary position by sliding a lock engaging member 36 located on the inside of the cap 35 through the grooves 37 located on the lock member 34 and head tube 33. In another embodiment, the steering assembly 30 may comprise any number of components necessary to steer a vehicle including, but not limited to, a steering wheel arrangement.

The illustrative mainframe assembly 44 is shown as including a front section 46 and a rear section 48. Front section 46 may have first and second ends. Front section 46 may be connected to steering assembly 30 such as by welding the first end of front section 46 to a portion of a head tube 33 of steering assembly 30. In addition, front section 46 may be secured to rear section 48 such as by welding the second end of front section 46 to the center of rear section 48. In another embodiment, any fastening means (e.g. unitary molding, bolting, adhesives, etc.) may be used to secure components of frame assembly 44 and steering assembly 30.

As previously indicated, rear section 48 of frame assembly 44 may comprise a U-shaped member mounted to the proximal end of front section 46 at approximately the center of rear section 48. In another embodiment, rear section 48 may comprise a U-shaped, V-shaped, Y-shaped or similarly open center member mounted to the second end of front section 46 at approximately the center of rear section 48. In addition, each arm 50a and 50b of rear section 48 may comprise a hub or drum 52 mounted to the distal end of each arm 50a and 50b of rear section 48. Each drum 52 may be configured so that a wheel 54 may be rotatably mounted thereto such as with a fastener or axle stud 56 extending through the center of drum 52 and wheel 54. In another embodiment, each wheel 54 may be mounted to rear section 48 in a variety of manners including, but not limited to rotatably mounting wheels 54 directly to arms 50a and 50b.

As will be appreciated, the configuration of the frame of the present invention results in a substantially unencumbered opening between rear wheels 54. As discussed later, this unencumbered opening allows the guide handle 80 of the present invention to extend through the opening, under tricycle 20, and be removed without interfering with rear section 48. This unique design also allows for use of the tricycle without the guide handle wherein no cross axle or step structure is present between the rear wheels to impede a user pushing the tricycle from behind.

The seat assembly 58 can be adjustably mounted at any position along the mainframe assembly 44 with one or more fasteners such as bolts 60. As illustrated in FIG. 1, seat assembly 58 may be advantageously positioned at about the second end of front section 46 of frame assembly 44. Seat assembly 58 may comprise a seat 62, mounting plates 64 (only one shown) and one or more receptors (e.g. 66a and 66b). If desired, a backrest 62a and seat belt 68 may be included with seat assembly 58 to help secure a child to tricycle 20. As will be understood, seat 62, mounting plates 64 and receptors 66a and 66b may be secured to a seat plate 70 to hold seat assembly 58 together. As illustrated in FIG. 1, receptors 66a and 66b comprise cylindrical tubes opening toward the rear of seat assembly 58. As described later, receptors 66a and 66b can be conveniently configured to accept connectors 92a and 92b associated with the guide handle 80 to secure the guide handle to the tricycle.

Still referring to FIG. 1, an exploded view of an exemplary guide handle 80 is shown as including a handle frame with a lower section 82, middle section 84 and upper section 86. In addition, each section 82, 84 and 86 of guide handle 80 may be comprised of two posts a and b each secured together such as by a crossbar 88a–88c. In another embodiment, guide handle 80 may comprise one or more posts and may similarly be comprised of one or more sections.

As illustrated in FIG. 1, for manufacturing, shipping, and storage efficiencies, a lower section 82, middle section 84 and upper section 86 may be removeably secured together such as by respective telescopic insertion of the ends of each section 82, 84 and 86 into the adjacent section. Also, it is contemplated that such sections 82, 84 and 86 could be connected together in a foldable, hingeable or collapsible type arrangement to facilitate storage or transportation. Of course, the guide handle 80 could also be provided as a unitary structure, whether foldable or not, such as in the form of a molded or extruded structural part or permanently attached assembly.

Lower section 82 of the guide handle 80 may comprise one or more footrests 90 for receiving a child's feet in operation. As described below, in another embodiment, a single bar may extend substantially perpendicularly to the posts 82a and 82b along lower section 82 of the guide handle 80 for placement of the feet. The footrest portion of handle 80 would be beneficial, for example, during early developmental stages when a child may not be ready (physically or otherwise) to attempt use of the pedals. In addition, lower section 82 may comprise a cross bar 88a to secure the right and left lower section posts 82a and 82b in spaced relation. In situations where the lower section 82 and footrests 90 are not required (e.g. the child's feet can reach and actuate the pedals of the tricycle), the lower section may be removed from the remainder of the guide handle 80 in use.

As further discussed below, middle section 84 is illustrated in this example as comprising two connectors 92a and 92b for telescopic insertion into the receptors (66a and 66b). Connectors 92a and 92b may be secured to the posts 84a and 84b of the middle section 84 by a weld or other conventional securing arrangement. Like the lower and upper sections (82 and 86), the middle section 84 may comprise a crossbar 88b or other structural arrangement to secure the right and left posts 84a and 84b together. In addition, the posts 84a and 84b of the middle section 84 may be configured for telescopic insertion into the corresponding poles of the upper and lower sections (82 and 86). For example, a first end of the middle section 84 may be configured to be telescopically inserted into a second end of the lower section 82 and first end of the middle section 84 may be configured to be telescopically inserted into a second end of the upper section 86. If desired, push button locks, bolts, etc. may be used to further secure the sections 82, 84 and 86 together. Also, it should be understood that while such telescopic alternatives may be most convenient and effective, other connection arrangements (e.g., clamps) could alternatively be used.

Top section 86 of a guide handle 80 may comprise a supervisor handle 93 with one or more grips 94 secured to posts 86a and 86b of the top section 86. Supervisor handle 93 and its grips 94 may be used by an adult to steer (or supervise) the tricycle, and can be provided in any of a variety of shapes and sizes.

Figure 2:
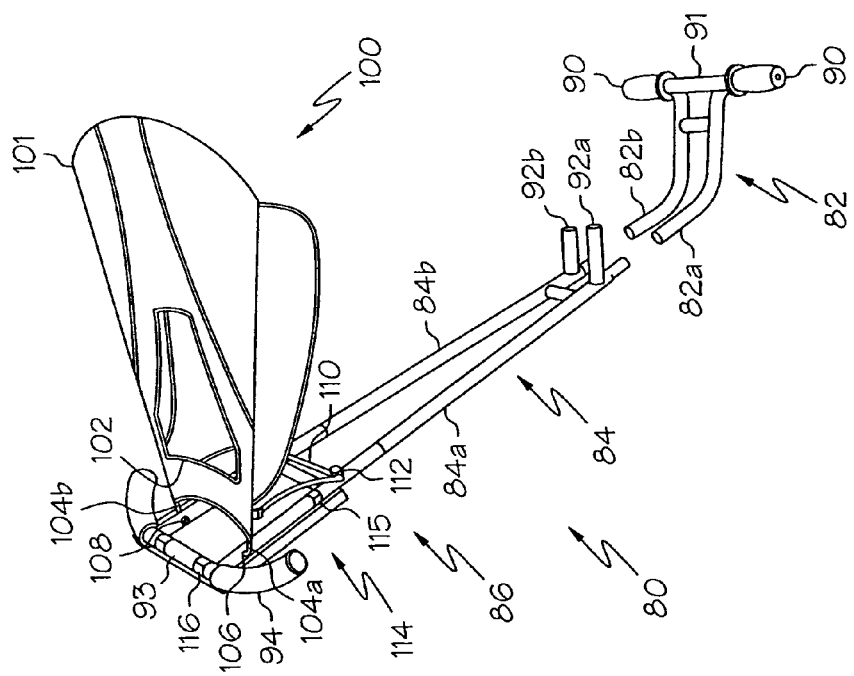
FIG. 2 illustrates an exemplary handle and accessories that may be secured to the guide handle of the present invention.

Another aspect of the present invention is that a variety of accessories may be selectively added to the guide handle. Referring to FIG. 2, for example, a canopy 100 may be removeably secured adjacent top section 86 of the guide handle 80. Such a canopy might be provided in a variety of forms. As illustrated in FIG. 2 the canopy 100 may comprise arms 104a and 104b to secure the canopy 100 to the top section 86 of the guide handle 80 by inserting the arms 104a and 104b into the apertures 106 of the top section 86 and securing nuts 108 to the arms 104a and 104b. It should be understood that the canopy 100 may be made up of any similar arrangement of material and support members secured at any position along the guide handle 80 by any conventional securing means. In addition, the canopy 100 may comprise a support bar 110 for supporting the weight of the canopy 100 against the top section 86 of the guide handle 80. The support bar 110 may rest in one or more brackets 112 positioned on the top section 86. The canopy 100 may be removed from the top section 86 by, for example, unscrewing the bolts 108 and pulling the arms 104a and 104b of the canopy 100 outward. Snap-in type arrangements could similarly be utilized.

The canopy 100 itself may comprise a visor 101 and may be comprised of a cloth, vinyl, plastic or any other material capable of blocking sun and/or weather elements. In one embodiment, the canopy may include one or more strategically placed windows 102 (e.g., clear material or openings) in visor 101 to allow sunlight through the canopy and/or for a guardian to monitor the activity under the visor 101.

If desired, a pocket pouch 114, tray, rack, basket or other convenience device may similarly be secured adjacent to the upper section 86 of the guide handle 80 by one or more Velcro straps 115. In another embodiment, the pocket pouch or other accessory 114 may be positioned at any location along the guide handle 80 and may be secured to the guide handle 80 by any conventional fastening means. Additional accessories may similarly be secured to the guide handle including, but not limited to a light, a horn or a water bottle holder.

Still referring to FIG. 2, the lower section 82 is illustrated as separate from the remainder of the guide handle 80. As previously discussed, the lower section 82 may be removed in situations where the rider does not need/desire footrests, but supervision through the use of the remainder of the guide handle is still desired. Additionally, as previously indicated, a foot bar 91 may extend across the posts 82a and 82b for placement of the rider's feet.

Figure 3:
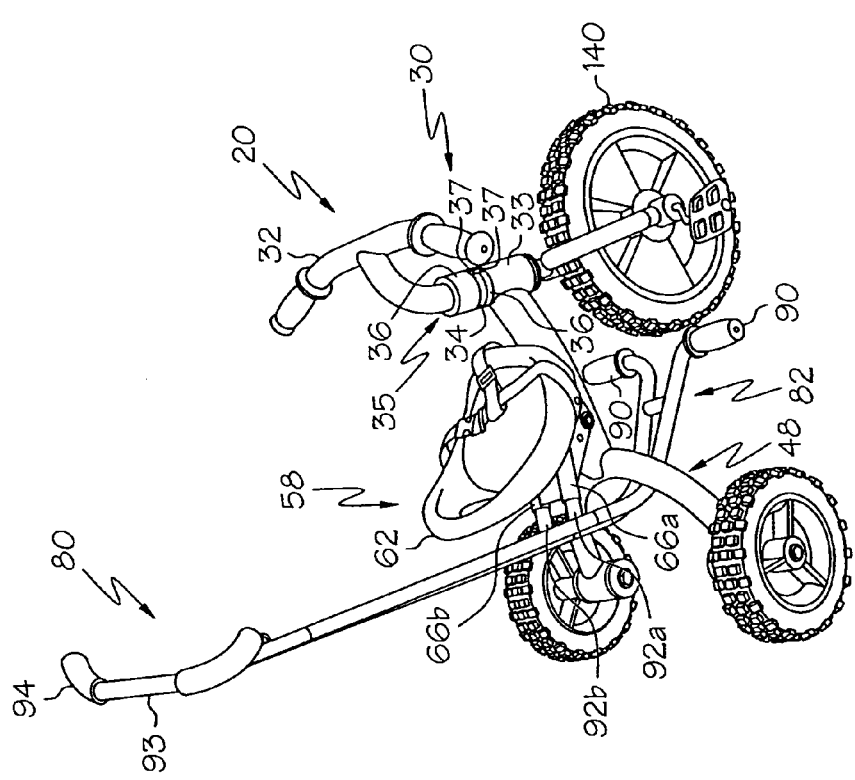
FIG. 3 illustrates an exemplary tricycle with attached guide handle in accordance with the present invention.

Referring to FIG. 3, an illustrative tricycle 20 and guide handle 80 in accordance with the present design is shown. The guide handle 80 in this example would be mounted to the tricycle 20 by maneuvering the lower section 82 of the guide handle 80 between the opening in the rear section 48 and telescopically inserting connectors 92a and 92b of the guide handle 80 into receptors 66a and 66b respectively. Guide handle 80 may be removed by essentially reversing the process. If desired, as mentioned above, additional fasteners or retainers may be associated with connectors 92a and 92b and/or receptors 66a and 66b such as a clamping device or button lock mechanism to further secure guide handle 80 to tricycle 20.

While the foregoing description refers to attaching guide handle 80 to tricycle 20 by telescopic insertion of connectors 92a and 92b into receptors 66a and 66b located within the seat assembly 58, it is contemplated that such telescoping attachment may exist in a variety of different embodiments. It should be understood that the connector/receptor arrangement should be designed to provide for convenient and stable attachment/detachment, while being strong enough to provide adequate control and ease of use. As such, any number of connector/receptor connections and/or other clamping or removable attachment configurations may be utilized. For example, connectors 92a and 92b may telescopically fit over receptors 66a and 66b rather than telescopically fitting within receptors 66a and 66b. In addition, receptors 66a and 66b may be associated with the rear section 48 of tricycle 20 or positioned elsewhere other than seat assembly 58. Of course, attachment arrangements with no telescoping characteristics could equally be utilized. For example, the guide handle may be configured to snap into an apparatus positioned on the tricycle reminiscent of a boot and snow ski arrangement. In addition, the handle and/or tricycle may comprise one or more clips for securing the handle to the tricycle.

Still referring to FIG. 3, in operation, a child may sit on the seat 62 with his/her feet supported on the footrests 90 of guide handle 80. An adult may push and/or guide tricycle 20 by placing their hands on the grip 94 of the supervisor handle 93 and pushing forward. If desired, the adult may pull back on the supervisor handle 93 thereby lifting the front wheel 40 off of the ground and pushing tricycle 20 forward reminiscent to a two-wheeled dolly.

Alternatively, if the adult desires to have full steering control of the tricycle 20, the adult may activate a steering lockout arrangement in order to set the steering assembly in a predetermined, stationary position. For example, in one embodiment as shown in FIGS. 4A–4D, one might lift cap 35 upwardly, and rotate the cap in order to align one or more engaging members 36 with corresponding first grooves (or receptors) 37a in the locking member 34 and second grooves (or receptors) 37b in head tube 33. In another embodiment, cap 35 may be suspended above locking member, such by, for example, a detent mechanism. FIG. 4A illustrates a bottom view of a cap 35 having two spaced engaging members 36. While two engaging members 36 are illustrated in FIGS. 4A and C, it is contemplated that any number of engaging members (and grooves/receptors) may be utilized to selectively lock handle bars 32. Engaging members 36 may comprise any shape and size, and may be provided in any number and arrangement so as to securely fit into associated corresponding grooves 37a–37c.

FIG. 4B illustrates a top view of an exemplary locking member 34 corresponding with a cap such as shown in the example of FIG. 4A. In one embodiment, locking member 34 may be secured to lower section 32a of handlebars 32 or other such rotating member for steering by, for example, fastener 39. As illustrated, locking member comprises two sets of grooves including first grooves (or channels) 37a and third grooves (or recesses) 37c. In some embodiments, first grooves 37a may simply be used as channels to allow engaging members 36 of cap 35 to extend toward head tube 33. As discussed later herein, because third grooves/recesses 37c do not provide a complete through channel, they may be used, when holding engaging members 36 in an unlocked position (e.g. where the steering mechanism is free to rotate), to help prevent the cap 35 from moving about the locking mechanism and inadvertently engaging second grooves 37b of head tube.

Referring to FIG. 4D, an upper plate or ring 33a on head tube 33 or other such stationary member may incorporate associated second grooves 37b. In one embodiment, second grooves 37b may be integrated within head tube 33 itself. In another embodiment, and as shown in FIG. 4D, head tube 33 may comprise an associated head tube portion attached such as a plate or ring 33a comprised of plastic, steel or other durable material and having the second grooves 37b associated within the portion 33a.

If locking of the handle bars 32 is desired, first grooves 37a of the locking member may be aligned with second grooves 37b of the head tube. This might be accomplished by positioning of the steering assembly such that wheel 40 is oriented straight ahead (or in some other desired predetermined position), or by lining up indicia (not shown) on exterior surfaces of the head tube 33 and handle bars 32. Once the engaging members 36 are aligned with first and second grooves 37a and 37b, respectively, cap 35 may be pushed downward to slide one or more engaging member(s) 36 into both sets of grooves. Such action may selectively fix the locking member 34 about the head tube 33 thereby preventing rotation of the handle bars 32 and thereby maintaining the front wheel 40 in a preset first stationary position. In this way, the overall character and extent of control by the adult supervisor can be adopted to the development level of the child at the time. If desired, a biasing member can be included to tend to urge cap 35 into a locked position. For example, a biasing sleeve 41 may be positioned around middle section 32b of handlebars 32 and work to continuously bias cap 35 downward. Such bias may be useful to prevent cap from undesirably disengaging intended grooves.

In order to unlock the handlebars 32, engaging members 36 may be disengaged from the first and second grooves 37a and 37b and the cap lifted upwardly. As previously discussed, third grooves 37c may be located on the locking member 34 a distance from the first grooves 37a so that cap 35 may be rotated and one or more engaging members 36 may be engaged therein to hold the cap in an unlocked or disengaged position. Such embodiment may prevent the cap 35 from rotating about the locking member 34 and inadvertently engaging second groove 37b when free rotation of the front wheel is desired.

Once the child is developed sufficiently to pedal and control the tricycle without assistance the cap may be disengaged from the grooves 37a and 37c so that the handlebars 32 may rotate and, the lower section 82 of guide handle 80 (and eventually the entire guide handle) may be removed from tricycle as discussed above.

It is contemplated that the lock mechanism of the present invention may be configured in a variety of other embodiments. For example, the main feature of the locking mechanism of the present invention is the locking of a stationary member to a rotatable member with a locking device in order to fix the front wheel(s) in a preset position. In the embodiment described above, the stationary and rotatable members were accomplished by head tube portion 33a and the locking member 34, respectively. In another embodiment, stationary member (such as a lever, for example) may be secured to any portion of the tricycle, and configured to engage the rotatable member.

Stationary and rotatable members of the invention may be configured with channels (or groves/recesses) to provide engagement by the locking device or engaging member(s). In addition, locking device (described above as engaging member(s) 36 disposed within a cap) may comprise multiple apparatuses configured to fit into and fix a rotatable member about a stationary member. For example, in one embodiment, stationary member may comprise the opening and outline for a gear. In such embodiment, a rotatable gear may hover above opening when rotation is desired. When locking is desired, the user may push a button of, for example, a detent mechanism to drop the gear into the opening, the teeth of the gear (the locking devices) acting against the corresponding openings (e.g. grooves or recesses) thereby fixing the handlebars in a stationary position. In another embodiment, locking device may comprise a key device configured to drop into a keyway of the stationary member.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the tricycle and guide handles in accordance with the present invention may comprise a variety of different sizes and be attached to tricycles in a variety of different arrangements. Accordingly, while some of the alternative embodiments of the tricycle and guide handles have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A tricycle comprising:
   (a) a mainframe having a front section including a steering assembly with a wheel mounted thereto and a rear section supporting a pair of spaced wheels; and
   (b) a locking mechanism for said steering assembly comprising:
      (i) a locking member secured to a rotating member, said locking member having a first groove;
      (ii) a stationary member having a second groove;
      (iii) a rotatable cap associated with said steering assembly having an engaging member and including engaged and disengaged positions, wherein said cap is rotatable between said engaged and disengaged positions;
      (iv) said engaging member configured to selectively engage with said first and second grooves thereby preventing relative rotation between said locking member and said stationary member when in an engaged position.

2. The tricycle of claim 1, wherein said locking mechanism further comprises a biasing sleeve associated with said steering assembly and said cap, said biasing sleeve configured to bias said cap toward said stationary member.

3. The tricycle of claim 1, wherein said locking mechanism further comprises a third groove, said engaging member further configured to selectively engage with said third groove thereby preventing said engaging member from moving into said engaged position.

4. The tricycle of claim 1, further comprising a receptor configured to receive a guide handle.

5. The tricycle of claim 1, wherein said rear section further comprises two drums each supporting one of said spaced wheels thereto.

6. The tricycle of claim 1, further comprising a seat assembly mounted to said front section of said mainframe and including at least one receptor.

7. The tricycle of claim 6, further comprising a guide handle having at least one connector and a pair of footrests integrally connected to said guide handle adjacent a lower section thereof, wherein said connector is configured to be releasably attached to said receptor of said seat assembly.

8. The tricycle of claim 7, wherein said guide handle further comprises a removable canopy secured adjacent an upper section.

9. A tricycle comprising:
   (a) a mainframe having a front section including a steering assembly with a wheel mounted thereto and a rear section supporting a pair of spaced wheels;
   (b) a guide handle removably secured to said mainframe;
   (c) a locking mechanism associated with said steering assembly, said locking mechanism comprising:
      (i) a locking member having a first groove;
      (ii) a stationary member having a second groove;

(iii) a cap associated with said steering assembly having an engaging member, said engaging member including engaged and disengaged positions;

(iv) said engaging member configured to selectively engage with said first and second grooves thereby preventing relative rotation between said locking member and said stationary member when in an engaged position.

10. The tricycle of claim 9, wherein said locking mechanism further comprises a biasing sleeve associated with said steering assembly and said cap, said biasing member configured to bias said cap toward said stationary member.

11. The tricycle of claim 9, wherein said locking member further comprises a third groove, said engaging member further configured to selectively engage with said third groove thereby preventing said engaging member from moving into said engaged position.

12. The tricycle of claim 9, further comprising a receptor configured to receive said guide handle.

13. The tricycle of claim 9, further comprising a seat assembly mounted to said front section of said mainframe and including at least one receptor.

14. The tricycle of claim 13, wherein said guide handle includes at least one connector, wherein said connector is configured to be releasably attached to said receptor of said seat assembly.

15. The tricycle of claim 9, wherein said guide handle further comprises a pair of footrests integrally connected to said guide handle adjacent a lower section thereof.

* * * * *